US009847103B1

(12) United States Patent
Chen

(10) Patent No.: US 9,847,103 B1
(45) Date of Patent: Dec. 19, 2017

(54) DATA STORAGE DEVICE CARRIER AND DATA STORAGE SYSTEM USING THE SAME

(71) Applicants: HONGFUJIN PRECISION ELECTRONICS (TIANJIN) CO., LTD., Tianjin (CN); HON HAI PRECISION INDUSTRY CO., LTD., New Taipei (TW)

(72) Inventor: Hung-Wei Chen, New Taipei (TW)

(73) Assignees: HONGFUJIN PRECISION ELECTRONICS (TIANJIN) CO., LTD., Tianjin (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/356,740

(22) Filed: Nov. 21, 2016

(30) Foreign Application Priority Data

Aug. 24, 2016 (CN) .......................... 2016 1 0713915

(51) Int. Cl.
G11B 33/02 (2006.01)
(52) U.S. Cl.
CPC ................................. G11B 33/027 (2013.01)
(58) Field of Classification Search
CPC .................................................. G11B 33/027
See application file for complete search history.

(56) References Cited

U.S. PATENT DOCUMENTS

| 6,460,948 | B2* | 10/2002 | Roesner | G06F 1/184 |
| | | | | 312/223.1 |
| 6,556,432 | B2* | 4/2003 | Chen | G06F 1/184 |
| | | | | 312/223.1 |
| 6,580,606 | B1* | 6/2003 | Leman | G06F 1/184 |
| | | | | 312/223.1 |
| 6,625,014 | B1* | 9/2003 | Tucker | G06F 1/184 |
| | | | | 312/223.1 |
| 8,649,167 | B2* | 2/2014 | Bala | G11B 33/128 |
| | | | | 361/679.01 |
| 8,837,136 | B2* | 9/2014 | Hu | G11B 33/124 |
| | | | | 248/220.21 |
| 9,030,819 | B2* | 5/2015 | He | H05K 7/14 |
| | | | | 248/222.51 |
| 2002/0085345 | A1* | 7/2002 | Chen | G06F 1/184 |
| | | | | 361/679.33 |
| 2005/0024819 | A1* | 2/2005 | Peng | G06F 1/184 |
| | | | | 361/679.33 |
| 2005/0057895 | A1* | 3/2005 | Chen | G06F 1/187 |
| | | | | 361/679.33 |

(Continued)

Primary Examiner — Lisa Lea Edmonds
(74) Attorney, Agent, or Firm — Steven Reiss

(57) ABSTRACT

A data storage device carrier includes a first supporting bracket and an upper cover. The first supporting bracket includes a first bottom plate and two first side plates, each of the first side plates defines an opening on an upper end and a sliding slot; the upper cover is slidably attached to the first supporting bracket, the first supporting bracket is configured to accommodate the first data storage device, the limiting columns are respectively received in the sliding slots via the openings, the top plate is configured to resist the upper surface of the first data storage device, the top plate comprises a connecting piece for connecting with another supporting bracket. A data storage system is further disclosed.

20 Claims, 11 Drawing Sheets

(56) References Cited

U.S. PATENT DOCUMENTS

| | | | |
|---|---|---|---|
| 2006/0126288 A1* | 6/2006 | Chen | G06F 1/184 |
| | | | 361/679.33 |
| 2008/0094794 A1* | 4/2008 | Hass | G06F 1/187 |
| | | | 361/679.33 |
| 2012/0268889 A1* | 10/2012 | Ganta | G11B 33/128 |
| | | | 361/679.33 |
| 2015/0029656 A1* | 1/2015 | Lu | G11B 33/124 |
| | | | 361/679.39 |

* cited by examiner

DATA STORAGE DEVICE CARRIER AND DATA STORAGE SYSTEM USING THE SAME

FIELD

The subject matter herein generally relates to a data storage device carrier and storage systems using the data storage device carrier.

BACKGROUND

Data storage devices, such as hard disk drives, are generally used to store data. In many applications, a plurality of data storage devices is mounted in carriers that are housed in a single chassis, the plurality of data storage devices are removable for maintenance or replacement when necessary.

The number of mounting positions of a conventional chassis is predetermined. For example, a typical known chassis of standard 2U (a "U" being 1.75 inches, approx. 44.45 mm) height contains 4 mounting positions, thus may hold 4 data storage devices each of 15 mm height at most, or may hold 4 data storage devices each of 7 mm height.

BRIEF DESCRIPTION OF THE DRAWINGS

Implementations of the present technology will now be described, by way of example only, with reference to the attached figures.

DETAILED DESCRIPTION

Figure 1:
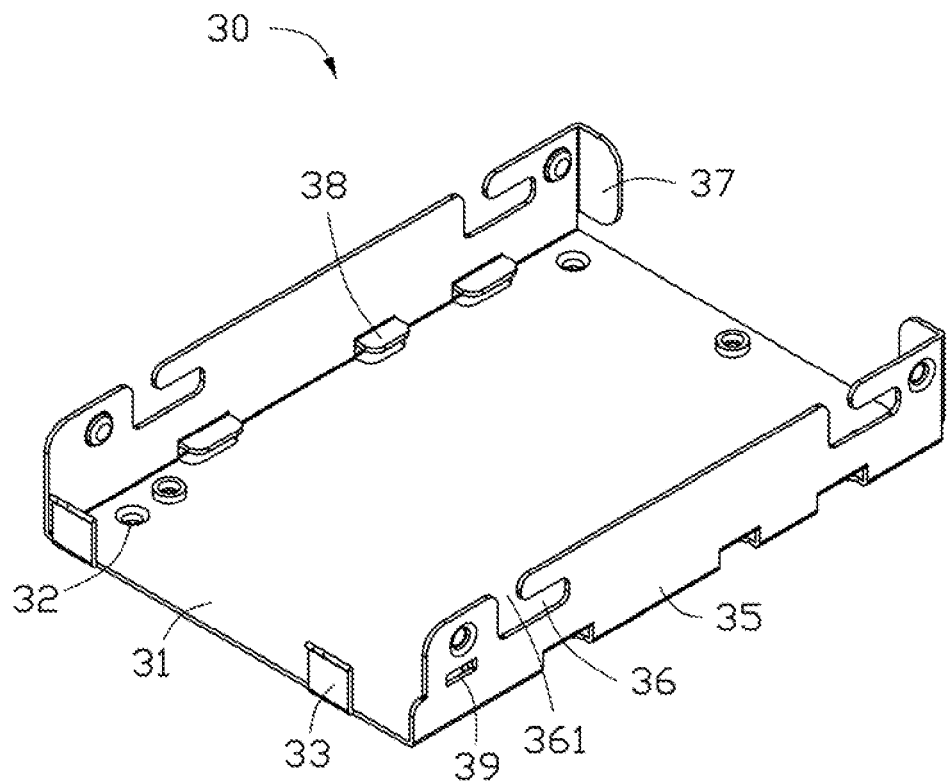
FIG. 1 is an isometric view of an exemplary embodiment of a first supporting bracket of the data storage device carrier.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 10:
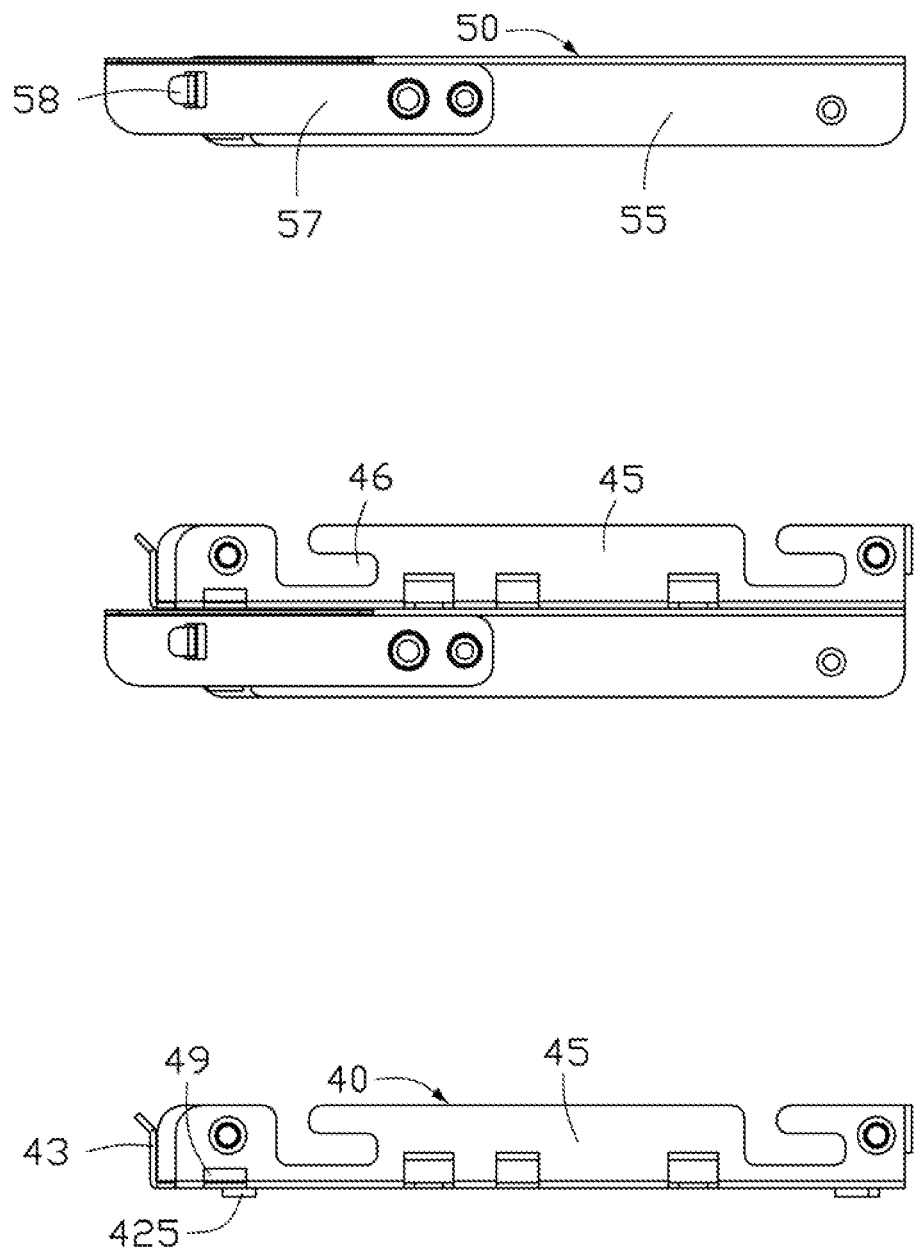
FIG. 10 is an exploded view of the two second supporting brackets and the two upper covers of FIG. 9.

FIG. 10 illustrates a data storage device carrier for fixing a first data storage device (not shown) and a second data storage device (not shown). The data storage device carrier includes at least one first supporting bracket 30, at least one second supporting bracket 40, and at least two upper covers 50. One of the upper covers 50 is slidably attached to the first supporting bracket 30, another one of the upper covers 50 is slidably attached to the second supporting bracket 40. For a better understanding, the data storage device carrier will be explained with one first supporting bracket 30, one second supporting bracket 40, and two upper covers 50 hereinafter as an example.

Figure 5:
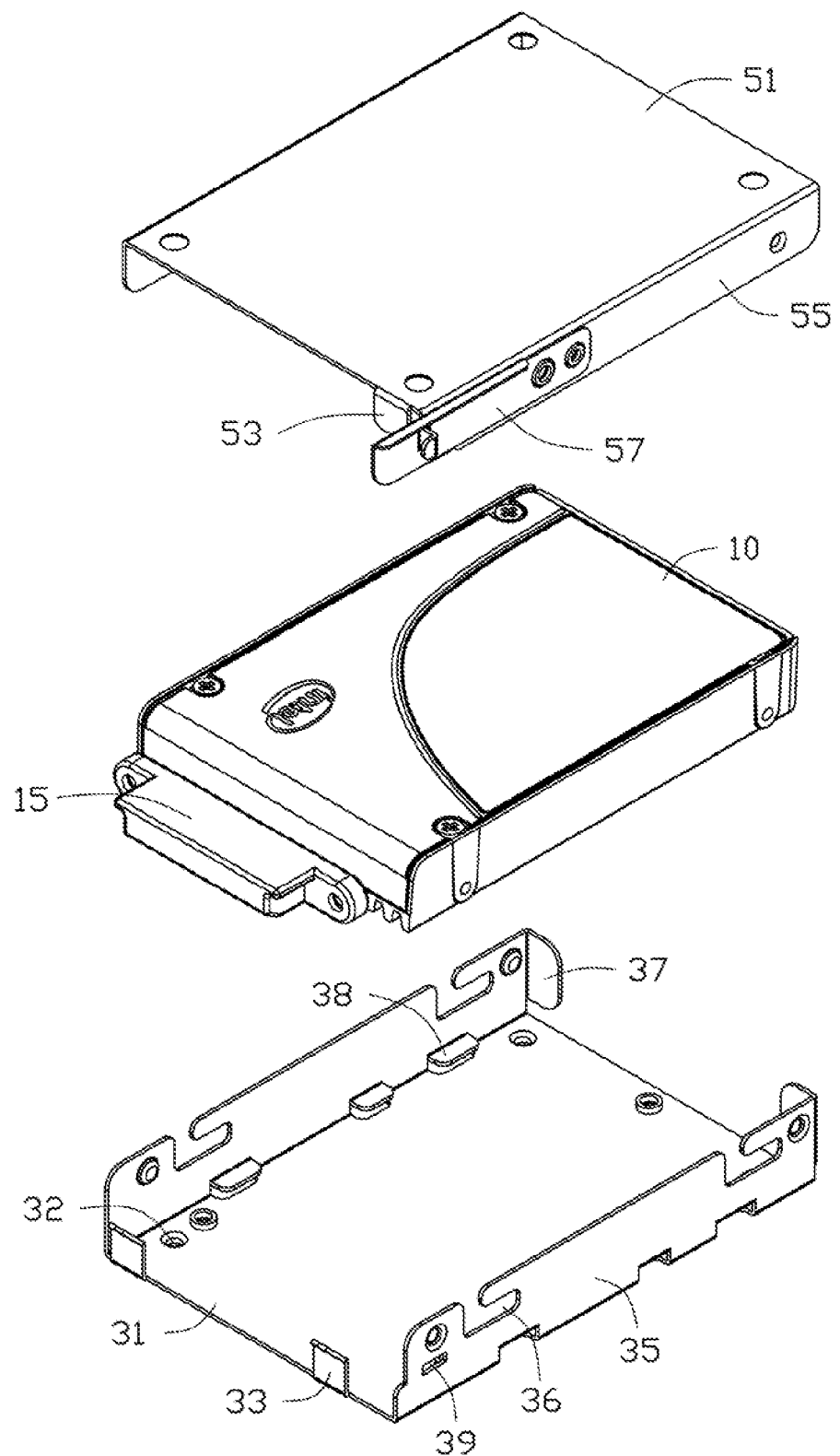
FIG. 5 is an exploded, isometric view of an exemplary embodiment of a first data storage device and the data storage device carrier.
Figure 6:
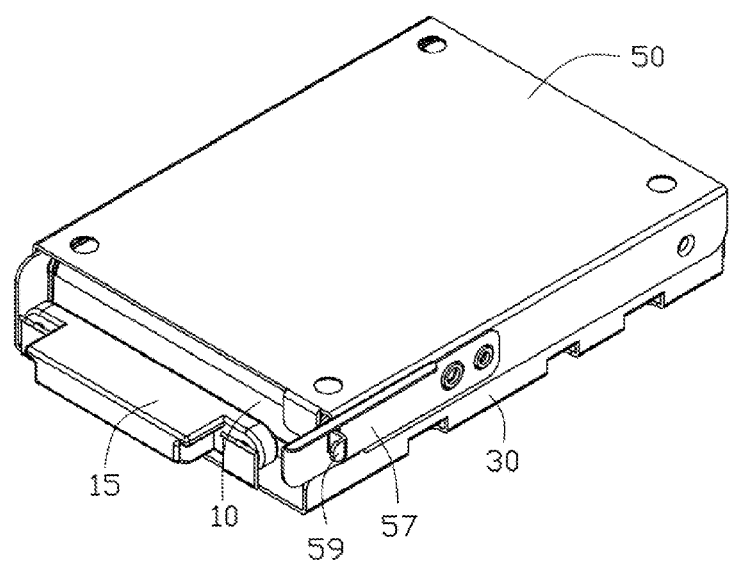
FIG. 6 is an assembled, isometric view of an exemplary embodiment of the first data storage device and the data storage device carrier of FIG. 5.

Referring to FIGS. 5 and 6 as an exemplary embodiment, each of the first data storage device 10 and the second data storage device (not shown) includes a connector 15, which can be used to electrically connect to electronic components (not shown). In at least one exemplary embodiment, the height of the first data storage device 10 is greater than that of the second data storage device, for example, the height of the first data storage device 10 is 15 mm and the height of the second data storage device is 7 mm.

Figure 9:
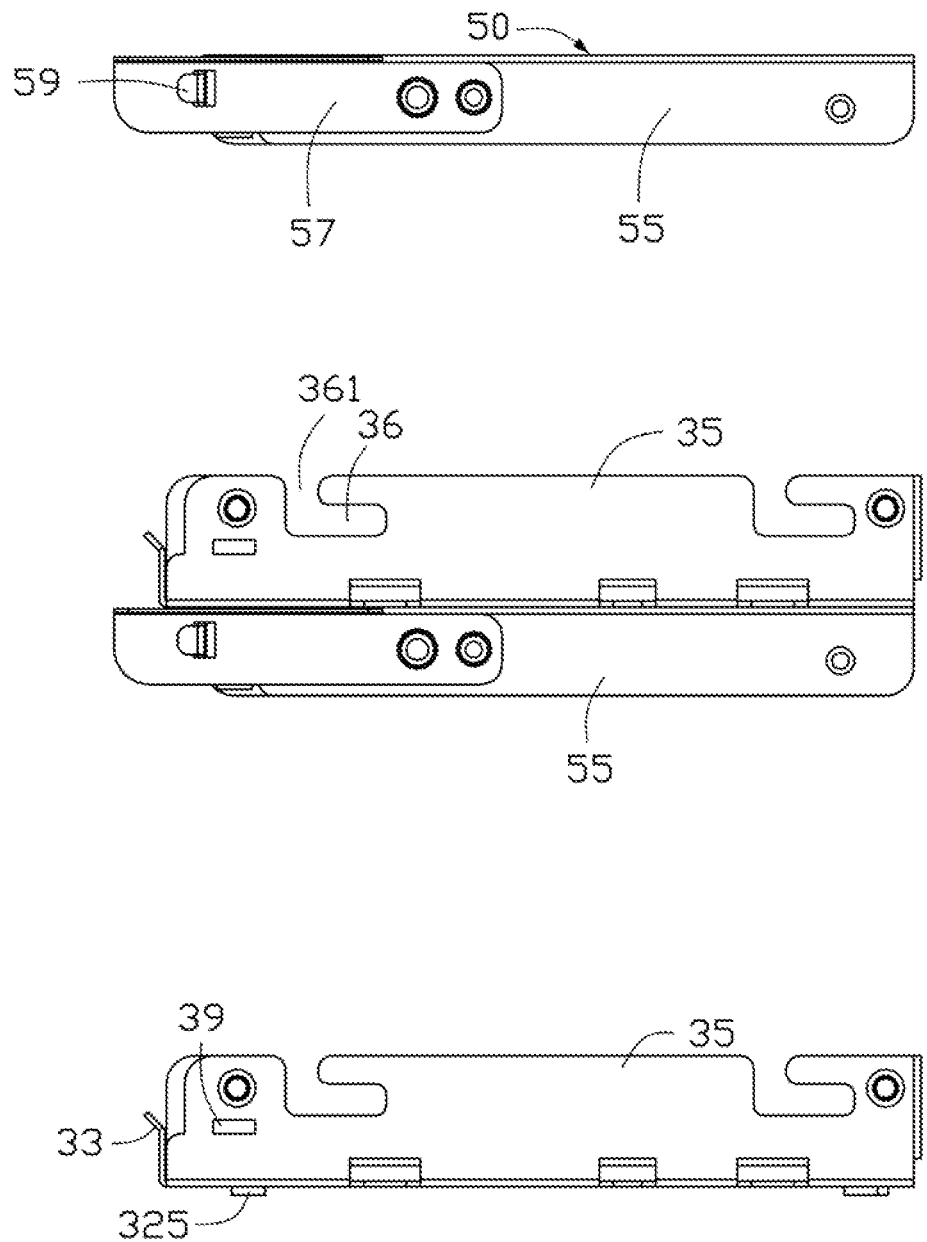
FIG. 9 is an isometric, side view of the two exemplary first supporting brackets and the two exemplary upper covers.

Referring to FIGS. 1 and 9 as exemplary embodiments, the first supporting bracket 30 includes a first bottom plate 31 and two first side plates 35. A rivet hole 32 is defined at each of the two ends of the first bottom plate 31. The first bottom plate 31 includes an upper surface and a lower surface opposite to the upper surface. The rivet hole 32 goes from the upper surface of the first bottom plate 31 through to the lower surface of the first bottom plate 31, the lower surface of the first bottom plate 31 includes a fixing collar 325. The first supporting bracket 30 can be riveted to the upper cover 50 or an enclosure (not shown) by the rivet hole 32. Two front guard sheets 33 are perpendicularly connected to a front end of the first bottom plate 31, the front guard sheets 33 can abut the connector 15 of the first data storage device 10 to prevent the connector 15 from falling off. Each of the first side plates 35 includes two sliding slots 36, each of the two sliding slots 36 includes an upper end and a lower end opposite to the upper end. An opening 361 is defined on the upper end of the two sliding slots 36, the upper cover 50 can be inserted into the sliding slots 36 and slid along the sliding slots 36. A back guard sheet 37 can be perpendicularly connected to a back end of the first bottom plate 31, the back guard sheet 37 can abut the back end of the first data storage device 10 to prevent the first data storage device 10 from falling off. Each of the first side plates 35 includes a plurality of supporting plates 38 spaced from the upper surface of the first bottom plate 31, and the supporting plates 38 are parallel to the first bottom plate 31. The first data storage device 10 can be mounted to the supporting plates 38. The supporting plates 38 can be positioned at a predetermined distance away from the upper surface first bottom plate 31 to provide easier mounting and better heat dissipation of the first data storage device 10. A rectangular hole 39 is defined in the front end of one of the side plates 35, an upper cover 50 can be attached to the first supporting bracket 30 through the rectangular hole 39.

Figure 2:
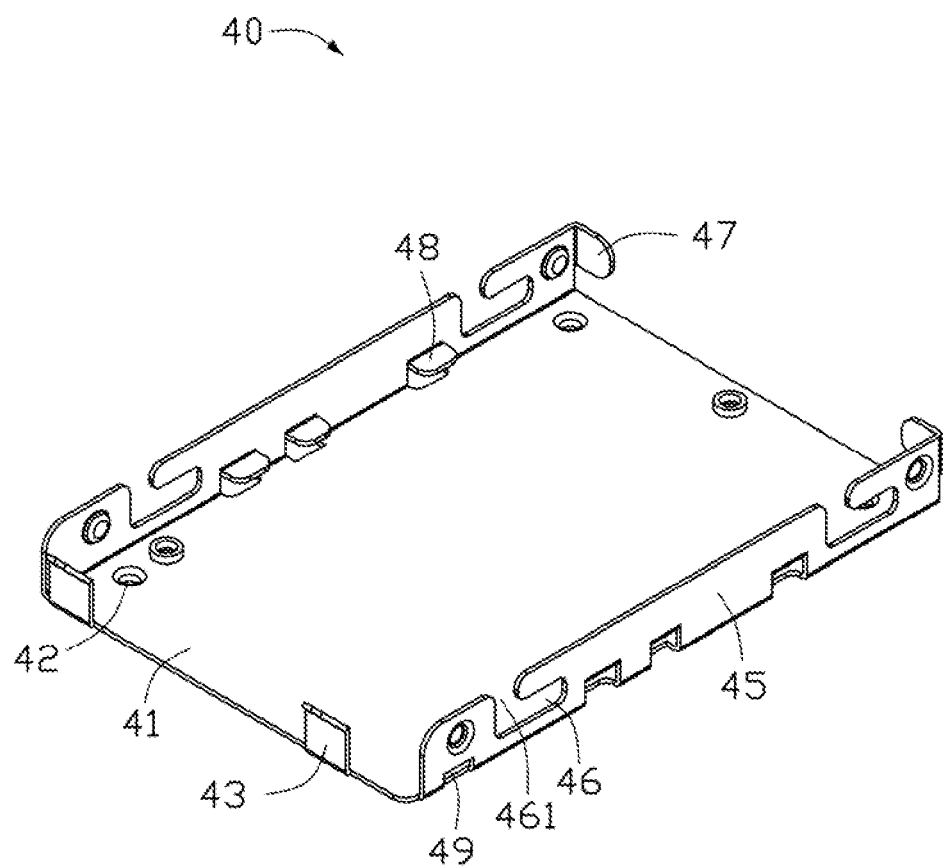
FIG. 2 is an isometric view of an exemplary embodiment of a second supporting bracket of the data storage device carrier.

Referring to FIGS. 2 and 10 as exemplary embodiments, the second supporting bracket 40 includes a second bottom plate 41 and two second side plates 45. The second bottom plate 41 includes an upper surface and a lower surface opposite to the upper surface. Each of the two ends of the second bottom plate 41 defines two rivet holes 42, the rivet holes 42 goes from the upper surface of the second bottom plate 41 through to the lower surface of the second bottom plate 41, the lower surface of the second bottom plate 41 includes a fixing collar 425. The first supporting bracket 30 can be riveted to an upper cover 50 or an enclosure (not shown) by the rivet holes 42. Two front guard sheets 43 are perpendicularly connected to a front end of the first bottom plate 31, the front guard sheets 33 abut the connector 15 of the second data storage device 20 to prevent the connector 15 from falling off. Each of the second side plates 45 comprises of an opening 461 on its upper end and two sliding slots 46, the upper cover 50 can be inserted into the sliding slot 46 and slid along the sliding slots 46. A back guard sheet 47 can be perpendicularly connected to a back end of the second bottom plate 41, the back guard sheet 47 can abut the back end of the second data storage device 20 to prevent the second data storage device 20 from falling off. Each of the second side plates 45 includes a plurality of supporting plates 48, the supporting plates 48 are spaced from the upper surface of the second bottom plate 41, and the supporting plates 48 are parallel to the second bottom plate 41, the second data storage device 20 can be mounted to the supporting plates 48. The supporting plates 48 can be positioned at a predetermined distance away from the upper surface of second bottom plate 41 to provide easier mounting and better heat dissipation of the second data storage device 20. A front end of one of the side plates 45 defines a rectangular hole 49, an upper cover 50 can be attached to the second supporting bracket 40 via the rectangular hole 49. In at least one exemplary embodiment, the height of the first side plates 35 is greater than the height of the second side plates 45.

Figure 3:
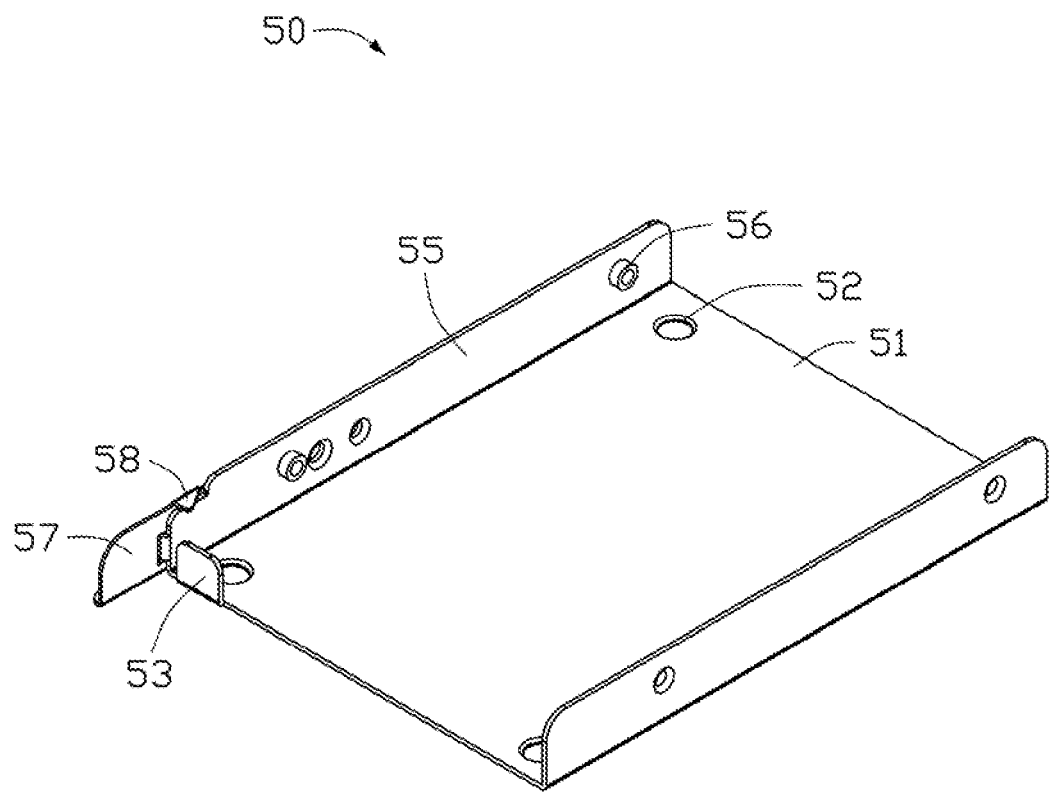
FIG. 3 is an isometric view of an exemplary embodiment of an upper cover of the data storage device carrier.
Figure 4:
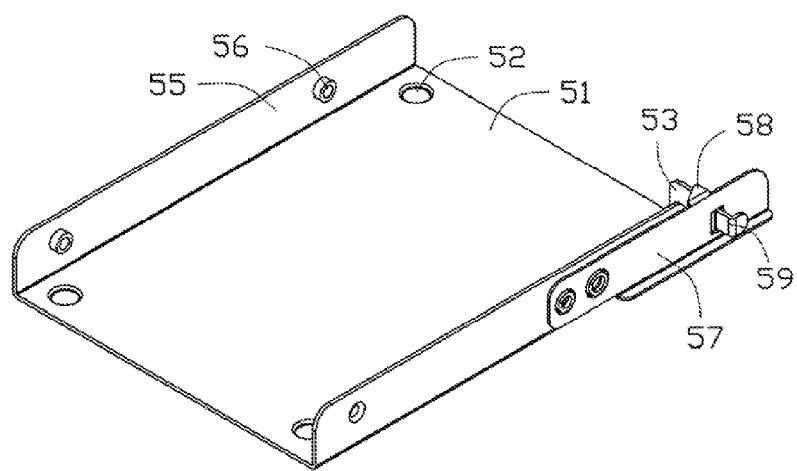
FIG. 4 is similar to FIG. 3, but viewed from another angle.

Referring to FIGS. 3 and 4 as exemplary embodiments, the upper cover 50 can include a top plate 51 and two sidewalls 55 respectively connected to the two sides of the top plate 51, the two sidewalls 55 can be perpendicular to the top plate 51. Two connecting portions 52, such as two connecting holes, can be configured on two ends of the top plate 51 and sheathed on the fixing collar 325, 425. In at least one exemplary embodiment, a front end of the top plate 51 includes a restricting plate 53, the restricting plate 53 can resist on a front side of the first data storage device 10 or the second data storage device 20 to prevent the first data storage device 10 or the second data storage device 20 from falling off. Each of the two sidewalls 55 defines two limiting columns 56 substantially opposite to each other, the limiting columns 56 are respectively received in the sliding slots 36, 46 via the openings 361, 461. A front side of one of the side walls 55 includes an elastic fixing plate 57, the fixing plate 57 includes a hook 58 near an upper surface of the side wall 55, the hook 58 can be mounted to the rectangular holes 39, 49. A front side of the side wall 55 includes a resisting plate 59 passing through the fixing plate 57, when the fixing plate 57 is elastically deformed, the resisting plate 59 resists on the fixing plate 57 to prevent the fixing plate 57 from being over deformed.

Referring to FIGS. 5 and 6 as exemplary embodiments, when the first data storage device 10 is accommodated in the first supporting bracket 30, a lower surface of the first data storage device 10 abuts the supporting plate 38, the connector 15 of the first data storage device 10 can abut the front guard sheets 33, the back end of the first data storage device 10 can abut the back guard sheet 37, two sides of the first data storage device 10 can be abutted on two first side plates 35. An upper cover 50 can be mounted to the first supporting bracket 30 with the top plate 51 abutting on an upper surface of the first data storage device 10. The limiting columns 56 of the two side walls 55 can be inserted into the opening 361, slide the upper cover 50 so that the limiting columns 56 can be slid into the sliding slot 36, pull the fixing plate 57 so that the hook 58 can be mounted to the rectangular hole 39 of the first side plate 35, thus the upper cover 50 can be fixed to the first supporting bracket 30. The restricting plate 53 resists on a front side of the first data storage device 10 to prevent the first data storage device 10 from falling off. The assembly of the first supporting bracket 30 and the first data storage device 10 can be accommodated in an enclosure (not shown), thereby accommodate the first data storage device 10 in an enclosure.

Figure 7:
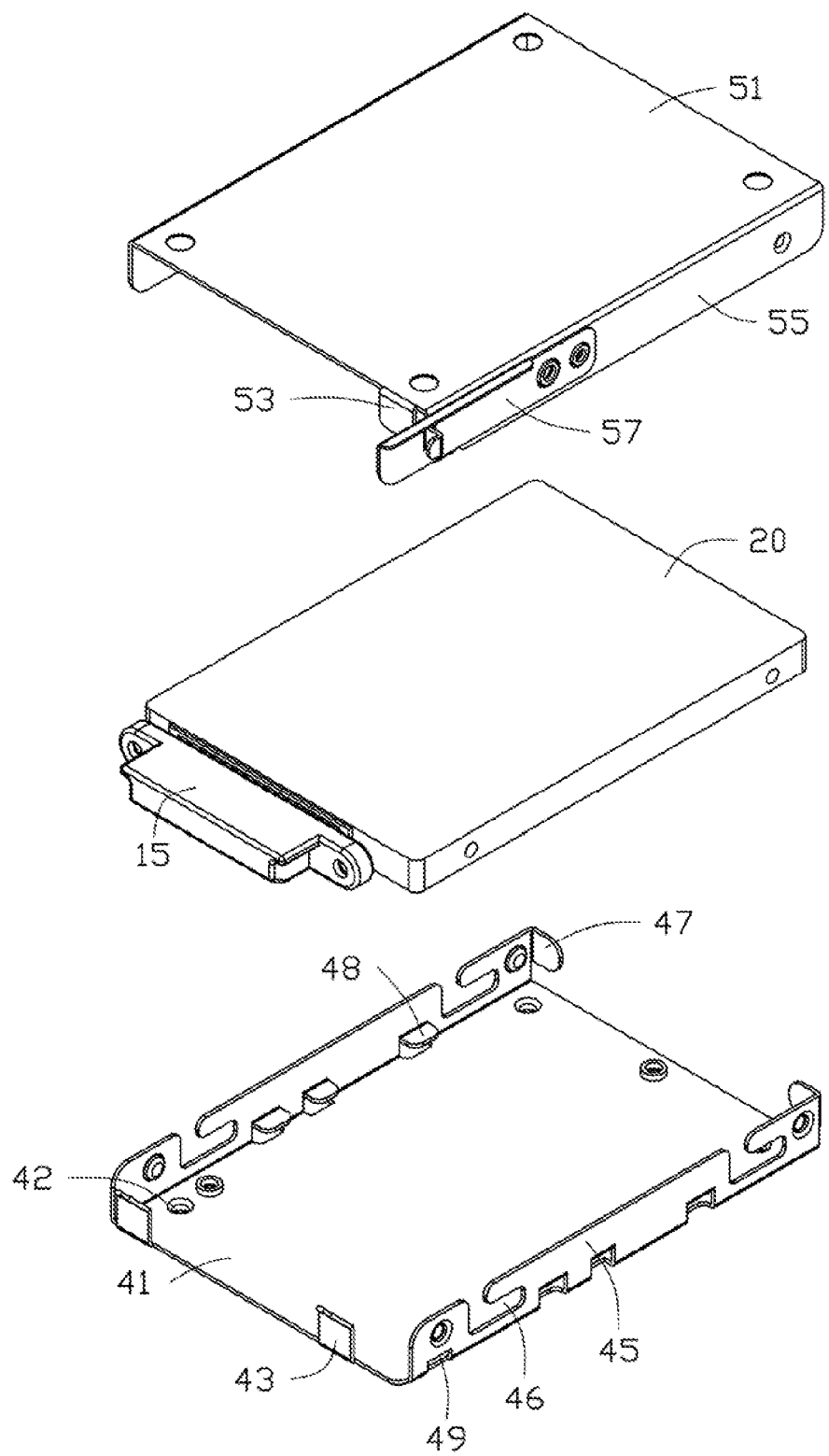
FIG. 7 is an exploded view of an exemplary embodiment of a second data storage device and the data storage device carrier.
Figure 8:
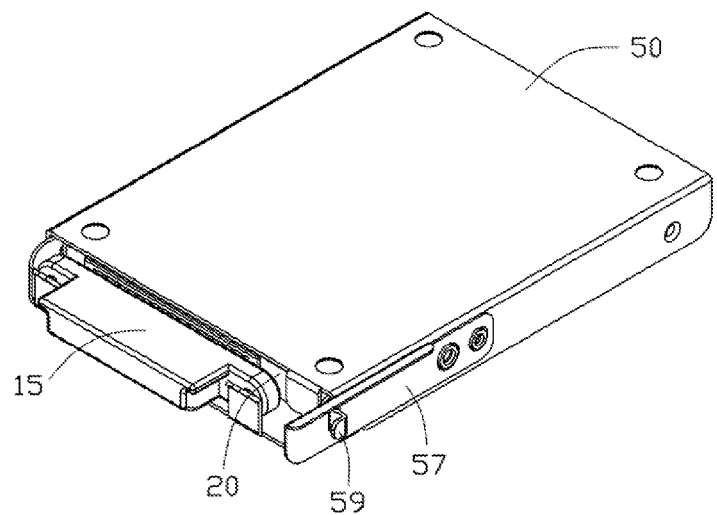
FIG. 8 is an assembled, isometric view of the second data storage device and the data storage device carrier of FIG. 7.

Referring to FIGS. 7 and 8 as exemplary embodiments, when the second data storage device 20 is accommodated in the second supporting bracket 40, a lower surface of the second data storage device 20 abuts the supporting plate 48, the connector 15 of the second data storage device 20 can abut the front guard sheets 43, the back end of the second data storage device 20 can abut the back guard sheet 47, two sides of the second data storage device 20 can abut the two second side plates 45. An upper cover 50 can be mounted to the second supporting bracket 40 with the top plate 51 resisting on an upper surface of the second data storage device 20. The limiting columns 56 of the two side walls 55 can be inserted into the opening 461, slide the upper cover 50 so that the limiting columns 56 can be slid into the sliding slot 46, pull the fixing plate 57 so that the hook 58 can be mounted to the rectangular hole 49 of the second side plate 45, thus the upper cover 50 can be fixed to the second supporting bracket 40. The restricting plate 53 resists on a front side of the second data storage device 20 to prevent the second data storage device 20 from falling off. The assembly of the second supporting bracket 40 and the second data storage device 20 can be accommodated in an enclosure (not shown), thereby accommodate the second data storage device 20 in an enclosure.

Figure 11:
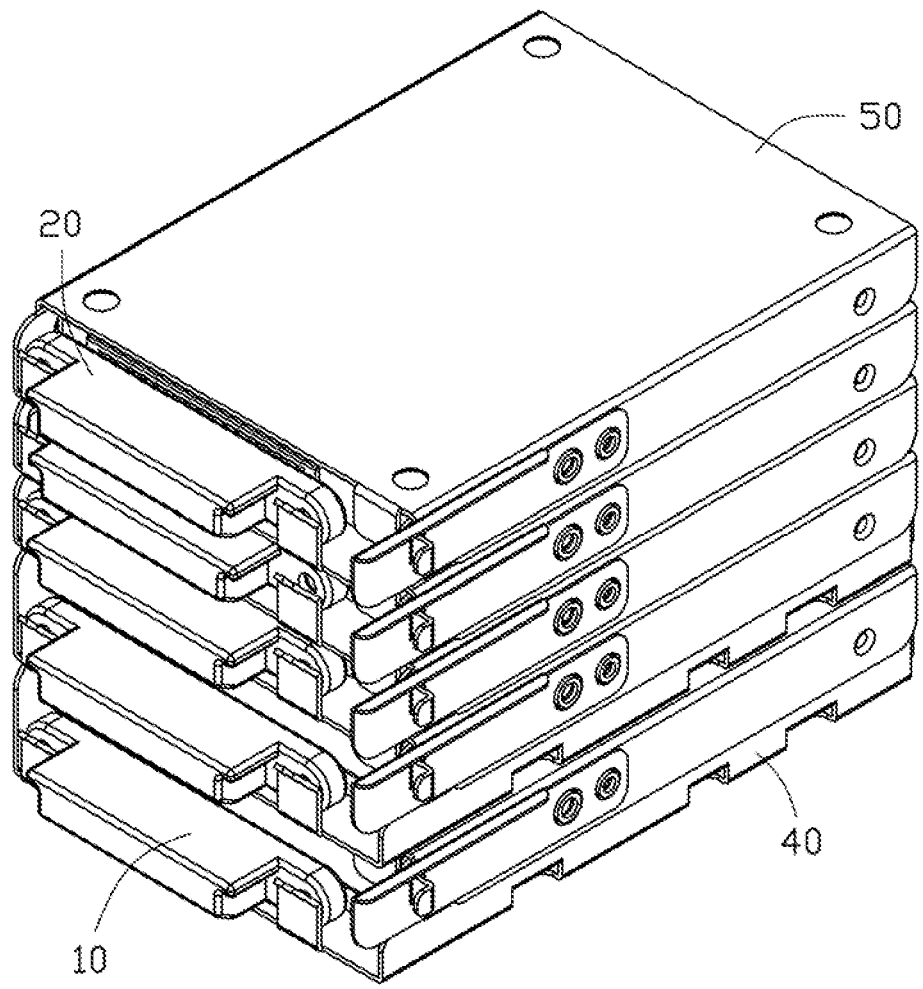
FIG. 11 is an assembled, isometric view of the data storage device carrier, the first data storage device, and the second data storage device.

Referring to FIGS. 9-11 as exemplary embodiments, when a plurality of first data storage devices 10 or a plurality of second data storage devices 20 are needed to be fixed in en enclosure, each of the first data storage devices 10 or the second data storage devices 20 can be correspondingly fixed to a first supporting bracket 30 or a second supporting bracket 40. One of the first supporting brackets 30 or second supporting brackets 40 can be mounted to the upper cover 50 of another first supporting bracket 30 or second supporting bracket 40, the first bottom plate 31 or the second bottom plate 41 resists on the top plate 51 of the upper cover 50, the fixing collar 325 of the first bottom plate 31 or the fixing collar 425 of the second bottom plate 41 is inserted into the connecting portion 52 of the top plate 51 to fix the first bottom plate 31 or the second bottom plate 41 to the top plate 51. Similarly, a first supporting bracket 30 and a second supporting bracket 40 can be fixed together to assemble a first data storage devices 10 and a second data storage devices 20, so that the plurality of first data storage devices 10 and the plurality of the second data storage devices 20 can be fixed in the enclosure in any order.

The exemplary embodiments shown and described above are only examples. Even though numerous characteristics and advantages of the present technology have been set forth in the foregoing description, together with details of the structure and function of the present disclosure, the disclosure is illustrative only, and changes may be made in the details, including matters of shape, size, and arrangement of the parts within the principles of the present disclosure, up to and including the full extent established by the broad general meaning of the terms used in the claims.

What is claimed is:

1. A data storage device carrier for fixing at least one first data storage device, comprising:
    a first supporting bracket comprising a first bottom plate and two first side plates respectively connected to two sides of the first bottom plate, each of the two first side plates comprises a sliding slot with an upper end, wherein an opening is defined in the upper end of the sliding slot;
    an upper cover slidably attached to the first supporting bracket, the upper cover comprising a top plate and two sidewalls respectively connected to two sides of the top plate, each of the two sidewalls defining two limiting columns opposite to each other;
    wherein the first supporting bracket is configured to accommodate the at least one first data storage device, the limiting columns are respectively received in the sliding slots through the openings, the top plate is configured to abut the upper surface of the first data storage device, and the top plate comprises a connecting piece for connecting with another supporting bracket.

2. The data storage device carrier of claim 1, further comprising a second supporting bracket configured for fixing a second data storage device, wherein the second supporting bracket comprising:
    a second bottom plate and two second side plates respectively connected to two sides of the second bottom plate, each of the second side plates defines an opening on the upper end and a sliding slot;
    wherein the second data storage device is accommodated in the second supporting bracket, the limiting columns of another upper cover respectively received in the sliding slots via the openings of the second side plates, and the upper surface of the second data storage device is resisted by the top plate of the another upper cover.

3. The data storage device carrier of claim 1, further comprising a plurality of front guard sheets perpendicularly connected to a front end of the first bottom plate, wherein the plurality of front guard sheets is configured to resist a connector of the second data storage device and prevent the connector from being disengaged from the second data storage device.

4. The data storage device carrier of claim 3, wherein the first bottom plate defines a plurality of rivet holes and a fixing collar, the upper surface of the upper cover comprises a plurality of connecting portions, and the first bottom plate is secured to the upper cover by riveting the fixing collar to one of the connecting portions.

5. The data storage device carrier of claim 1, further comprising a plurality of back guard sheets perpendicularly connected to a back end the first bottom plate, wherein the guard sheets are configured to secure the first data storage device by resisting on a back side of the first data storage device.

6. The data storage device carrier of claim 5, wherein each of the side plates comprises a plurality of supporting plates near and parallel to the first bottom plate, the supporting plates are configured to support the first data storage device.

7. The data storage device carrier of claim 6, wherein a front end of one of the side plates defines a rectangular hole, an upper cover is attached to the first supporting bracket via the rectangular hole.

8. The data storage device carrier of claim 1, wherein a front end of the top plate comprises a restricting plate for securing the first data storage device by resisting on a front side of the first data storage device.

9. The data storage device carrier of claim 1, wherein a front side of one of the side walls comprises an elastic fixing plate comprising a hook near an upper surface of the side wall, the hook is configured to be mounted to one of the first side plates.

10. The data storage device carrier of claim 9, wherein the front side of side wall comprises a resisting plate passing through the fixing plate;
    when the fixing plate is elastically deformed, the resisting plate resists on the fixing plate to prevent the fixing plate from being over deformed.

11. A data storage system comprising:
    an enclosure; and
    at least one data storage unit received in the enclosure, comprising
        a first supporting bracket comprising a first bottom plate and two first side plates respectively connected to two sides of the first bottom plate, each of the two first side plates comprises a sliding slot with an upper end, wherein an opening is defined in the upper end of the sliding slot;
        an upper cover slidably attached to the first supporting bracket, the upper cover comprising a top plate and two sidewalls respectively connected to two sides of the top plate, each of the two sidewalls defining two limiting columns opposite to each other;
        wherein the first supporting bracket is configured to accommodate the at least one first data storage device, the limiting columns are respectively received in the sliding slots through the openings, the top plate is configured to abut the upper surface of the first data storage device, and the top plate comprises a connecting piece for connecting with another supporting bracket.

12. The data storage system of claim 11, further comprising a second supporting bracket configured for fixing a second data storage device, wherein the second supporting bracket comprising:
    a second bottom plate and two second side plates respectively connected to two sides of the second bottom plate, each of the second side plates defines an opening on the upper end and a sliding slot;
    wherein the second data storage device is accommodated in the second supporting bracket, the limiting columns of another upper cover respectively received in the sliding slots via the openings of the second side plates, and the upper surface of the second data storage device is resisted by the top plate of the another upper cover.

13. The data storage system of claim 11, further comprising a plurality of front guard sheets perpendicularly connected to a front end of the first bottom plate, wherein the plurality of front guard sheets is configured to resist a connector of the second data storage device and prevent the connector from being disengaged from the second data storage device.

14. The data storage system of claim 13, wherein the first bottom plate defines a plurality of rivet holes and a fixing collar, the upper surface of the upper cover comprises a plurality of connecting portions, and the first bottom plate is secured to the upper cover by riveting the fixing collar to one of the connecting portions.

15. The data storage system of claim 11, further comprising a plurality of back guard sheets perpendicularly connected to a back end the first bottom plate, wherein the guard sheets are configured to secure the first data storage device by resisting on a back side of the first data storage device.

16. The data storage system of claim 15, wherein each of the side plates comprises a plurality of supporting plates near and parallel to the first bottom plate, the supporting plates are configured to support the first data storage device.

17. The data storage system of claim 16, wherein a front end of one of the side plates defines a rectangular hole, an upper cover is attached to the first supporting bracket via the rectangular hole.

18. The data storage system of claim 11, wherein a front end of the top plate comprises a restricting plate for securing the first data storage device by resisting on a front side of the first data storage device.

19. The data storage system of claim 11, wherein a front side of one of the side walls comprises an elastic fixing plate comprising a hook near an upper surface of the side wall, the hook is configured to be mounted to one of the first side plates.

20. The data storage system of claim 19, wherein the front side of side wall comprises a resisting plate passing through the fixing plate;
when the fixing plate is elastically deformed, the resisting plate resists on the fixing plate to prevent the fixing plate from being over deformed.

* * * * *